(12) United States Patent
Bobier

(10) Patent No.: US 7,058,138 B2
(45) Date of Patent: Jun. 6, 2006

(54) COORDINATED NUMERICAL CONTROL OF SIDEBAND ENERGY AND MODULATION COMPRESSION METHOD FOR THE RADIO FREQUENCY TRANSMISSION OF HIGH SPEED DATA

(75) Inventor: Joseph A. Bobier, Sunrise, FL (US)

(73) Assignee: XG Technology, LLC, Sarasota, FL (US)

( * ) Notice: Subject to any disclaimer, the term of this patent is extended or adjusted under 35 U.S.C. 154(b) by 0 days.

(21) Appl. No.: 11/217,029

(22) Filed: Aug. 31, 2005

(65) Prior Publication Data

US 2006/0045204 A1    Mar. 2, 2006

Related U.S. Application Data

(60) Provisional application No. 60/606,332, filed on Sep. 1, 2004.

(51) Int. Cl.
*H04L 27/04* (2006.01)
(52) U.S. Cl. ...................................... 375/295
(58) Field of Classification Search ................ 375/295, 375/316, 271–274, 303, 276, 305, 340, 261, 375/259, 268, 269, 300, 302, 320, 322, 323; 332/100, 103, 117, 149, 123–128; 329/127, 329/128, 300, 304, 315, 347
See application file for complete search history.

(56) References Cited

U.S. PATENT DOCUMENTS

| 4,656,647 | A  | * | 4/1987  | Hotine ........................ 375/279 |
| 5,909,460 | A  | * | 6/1999  | Dent ........................... 375/130 |
| 6,968,014 | B1 | * | 11/2005 | Bobier ........................ 375/271 |
| 2002/0058484 | A1 | * | 5/2002 | Bobier et al. ................ 455/108 |

\* cited by examiner

*Primary Examiner*—Tesfaldet Bocure
(74) *Attorney, Agent, or Firm*—Dennis L. Cook, Esq.

(57) ABSTRACT

An RF signal compression technique used to transport high bit-rate data over wired or wireless means using modulated radio frequency carrier waves whose purpose is to reduce the number of radio carrier modulation events, thus reducing the amount of radio sideband emissions, while increasing the amount of information conveyed by coordinating the modulation events. More specifically an improved compression method with coordinated padding for various methods of modulation by which the spectral channel width occupied by the radio signal and the power spectrum density of said signal can be controlled by numerically adjusting the coding format in a coordinated manner allowing for coordinated modulation events which permits multiple transmissions in a coverage area greatly increasing the amount of information transmitted and available users.

8 Claims, 5 Drawing Sheets

16 RF Cycles

*Table 1:* Example encoding with Index-16 (Note that 4 bits can be represented)

| Position | Binary Data | Position | Binary Data |
|---|---|---|---|
| 0000 | 1 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 |

FIGURE 4

| INDEX-N ENCODING | NUMBER OF DATA BITS | CARRIER FREQ (MHz) | PADDING SIZE X cycles | DATA RATE (MBPS) |
|---|---|---|---|---|
| 16 | 4 | 900 | 0 | 225 |
| 16 | 4 | 900 | 2 | 200 |
| 16 | 4 | 900 | 4 | 180 |
| 16 | 4 | 900 | 8 | 150 |
| 16 | 4 | 900 | 16 | 112.5 |
| 16 | 4 | 900 | 32 | 75 |
| 16 | 4 | 900 | 64 | 45 |
| 16 | 4 | 900 | 128 | 25 |
| 16 | 4 | 900 | 256 | 13.23529412 |
| 16 | 4 | 900 | 512 | 6.818181818 |
| 16 | 4 | 900 | 1024 | 3.461538462 |

Table (2)

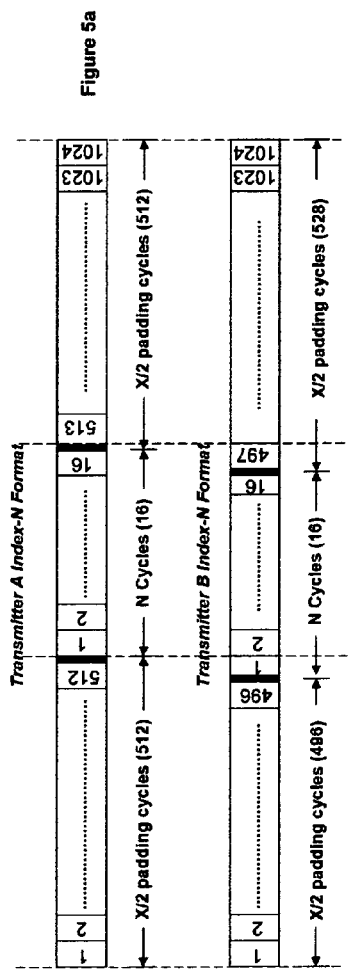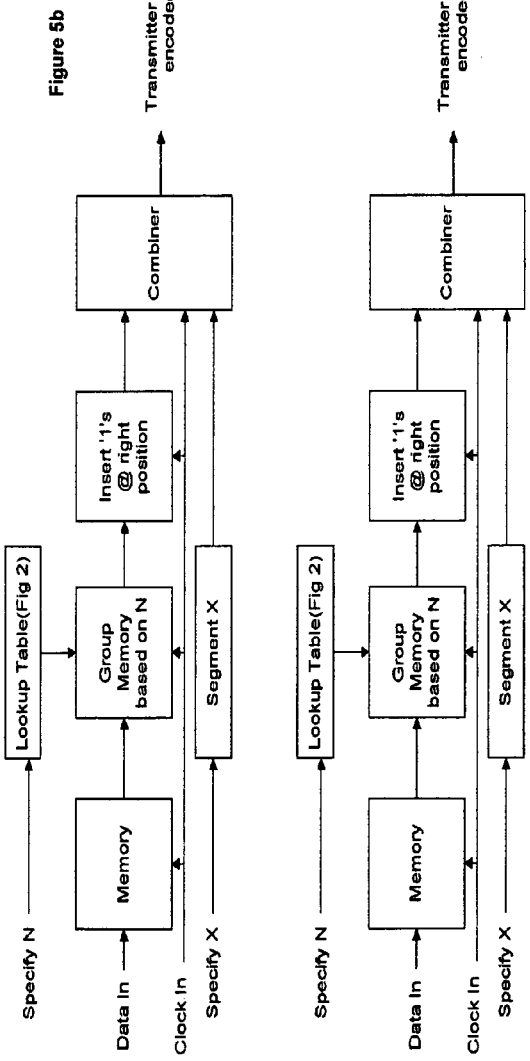

COORDINATED NUMERICAL CONTROL OF SIDEBAND ENERGY AND MODULATION COMPRESSION METHOD FOR THE RADIO FREQUENCY TRANSMISSION OF HIGH SPEED DATA

CROSS-REFERENCE TO RELATED APPLICATION

The present application claims the benefit of previously filed co-pending Provisional Patent Application, Ser. No. 60/606,332, filed Sep. 1, 2004.

FIELD OF THE INVENTION

This invention addresses the need to transport high bit-rate data over wired or wireless means using modulated radio frequency carrier waves. Specifically, the invention provides an improved compression method with coordinated padding for various methods of modulation by which the spectral channel width occupied by the radio signal and the power spectrum density of said signal can be controlled by numerically adjusting the coding format in a coordinated manner allowing for coordinated modulation events which permits multiple transmissions in a coverage area greatly increasing the amount of information transmitted and available users.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. Similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:
1. Frequency Division Multiple Access (FDMA)
2. Time Division Multiple Access (TDMA)
3. Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

It is well known by those skilled in the art that a radio signal consists of at least one electromagnetic energy packet. These packets are comprised of both an electrical field and a magnetic field traveling through space. The mathematical description of each field is that of a sinusoidal shape, with each field conjoined in a transverse relationship, mutually dependant upon one another.

In the traditional usage, when these packets (photons) are generated together into a continuum of sequential sine waves, we have what is referred to as a radio carrier, which if constituted of identical packets, is said to be un-modulated. For the radio spectrum to be pure, which consists of only one single and narrow radio channel when plotted on a spectral diagram, the packets are conjoined temporally so that as the phase angle of a preceding packet crosses the zero-degree end point, the proceeding packet is just beginning at the zero-degree angle. Thus from the perspective of the observer, a continuous 360 degree undulation of both electrical and magnetic fields would be observed.

Any radio system in use today will modify large groups of these conjoined packets in one or more ways to convey information. For example, a modern wireless phone might transmit near a frequency of 1.9 GHz and modulate the carrier at a rate of about 6 KHz to achieve a data throughput of 14.4 kbps. In this example, a portion of the carrier, consisting of about 316,666 individual sine waves is modified as a group to represent a single binary bit.

To represent the simplest form of communication, the binary system, there are several ways to alter at least one of the following four characteristics of the continuum of sine wave packets (referred to herein as sine waves) to indicate to the receiving mechanism that a binary one or zero is conveyed.

Sine waves can be modified in at least the following four basic ways:

1. Amplitude: The amplitude of the electrical and magnetic fields can be increased or decreased to cause either a larger or smaller signal to be detected at the receiving device. The change in amplitude can represent the conveyance of a binary one or a binary zero or even a change in binary state when the previous state is already known.
2. Frequency: The period of the individual sine waves within a group can be increased or decreased to make the same representation as in example one above. This is also called frequency modulation.
3. Interruption: The continuum of sine waves can be interrupted, then re-established to indicate a zero or one condition, or as in example one and two above, the interruption could represent a change in logic state assuming the previous state was known. This is sometimes known as CW or Pulse code modulation.
4. Phase: The phase of a group of sine waves could be altered so that the sine waves are in fact not sine waves any more. They now consist of an amalgamation of two or more frequencies, whose presence indicates the conditional change in logic state.

Many modulation techniques now exist that use any of the above methods either singularly or in combination. Lately a mixing of these methods has been in popular use because by modifying more than one characteristic, more than one single logic state can be represented. For instance the Quadrature Amplitude Modulation system (QAM) can combine the use of both amplitude and frequency modulation to represent multiple binary combinations.

Even though binary data stream transmission by wire has improved substantially in terms of data transfer rates, that improvement has not been as dramatic where transmission is by utilization of the RF spectrum. Current technology in data stream transmission by wire is shown in U.S. Pat. No. 5,661,373 titled Binary digital signal transmission system using binary digital signal of electrically discharged pulse and method for transmitting binary digital signal and issued Aug. 26, 1997 to Nishizawa, which discloses a binary digital signal transmission system wherein a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

It is also well recognized by those skilled in the art that in modern radio communications a troubling problem exists in the utilization of spectrum. Many radio communication services exist to support the market needs of many diverse users. Government agencies regulate the usage of radio spectrum among such diverse users as government, military, private business, radio common carriers (RCC) and unlicensed individual users. The need for radio spectrum is an immense problem. The problem is compounded because modern radio systems transport binary digital information using modulation methods that are merely adaptations of methods that were originally designed for conveyance of analog information. Namely, voice, music and video transmissions, which were the sole forms of information in the 20th century, are now quickly being replaced with digital representations of the same. Added to this is the need to allow the user to access digital information from the Internet, corporate databases and other sources. Truly this is a modern problem. Since the means of modulating the radio carrier are still the same as those used in the past the amount of spectral width required by individual transmitters is ever increasing. Well-known theories of modulation define these modulation systems and dictate that as the amount of information increases in a given modulated stream, the number of spectral byproducts, called sidebands will increase. For instance, using common methods of radio modulation, a typical channel width for a digital transmission will be about ½ of the rate of binary state change. Applied in real terms, a radio transmitter that is conveying information at a rate of 100 kilobits per second (KBPS) will require a clear section of radio spectrum of about 50 KHz of width, with the carrier at the center of the channel. In this age, 100 KBPS is a low rate of data transmission, so in practice many services are requiring huge allocations of the limited spectrum resource.

A solution is required that will allow the maximum amount of information to be conveyed, while consuming the least amount of spectral width, and that will allow the concurrent use of large sections of spectrum by numerous services without a high risk of mutual interference.

The coordinated padding and compression method of this disclosure improves the performance of various modulation techniques and helps alleviate this massive and growing problem.

BRIEF SUMMARY OF THE INVENTION

The method of this invention, hereinafter called coordinated padded Index-N, describes a data compression system for use with binary modulation systems. Its purpose is to reduce the number of radio carrier modulation events, thus reducing the amount of radio sideband emissions, while increasing the amount of information conveyed by coordinating the modulation events.

The embodiments of the invention disclosed in this application is described as applied to a method of modulation named Tri-State Integer Cycle Modulation (TICM) but could be used on any number of related modulation methods such as Missing Cycle Modulation (MCM), Suppressed Cycle Modulation (SCM), and Integer Cycle Frequency Hopping Modulation (ICFH) previously disclosed in patent applications by the inventors of this application. A description of the TICM technique follows:

The carrier wave consists of a continuum of sine wave RF cycles at a given fixed frequency. This frequency range can vary from low-frequency radio signals to high-frequency microwave.

All RF cycles are perfect sine waves.

Data is imposed upon the carrier wave by altering the base radio frequency of two sine waves of the continuum. A modulation event therefore consists of the frequency modification of two RF sine wave cycles (wavelets). Note that three (3), and only three (3) frequencies are needed for the TICM modulation scheme. These three (3) frequencies can be extremely close (e.g. less than 30 Khz apart, which is a standard cellular channel) or significantly further apart, depending upon the ability of the receiver to differentiate the frequencies. The modulation can thus be thought of as performed on an integer cycle basis because large groups of RF cycles need not be altered or modulated to convey the information. The sequence of events in the formation of one modulation event are as follows:

Insert one sinewave cycle into the carrier cycle continuum that is higher in frequency than the carrier.

Follow the above cycle with another cycle that is lower in frequency than the carrier. Return to the carrier frequency for the next and all proceeding cycles.

Between the base frequency sine waves and the modulated (alternate) frequency sine waves, there is perfect phase continuity. That is to say, the altered frequency sine waves will begin exactly at the 360 degree zero crossing point of the preceding cycle, and will continue through 360 degrees to an end exactly at the zero degree, zero crossing point of the proceeding sine wave.

The difference in radio frequency between, base carrier cycles and modulation event cycles is arbitrary, only constrained by the ability of the de-modulator to reliably differentiate the two signals.

The receiver (de-modulator) need only compare the frequency (phase time) of the current sine wave to the previous sine wave to determine whether or not a modulation event has occurred.

A compression method applied to the TICM invention, or other methods of modulation, was also previously disclosed called Index-N by the inventor wherein multiple modulating frequencies are utilized to represent multiple logic conditions thus creating a binary data compression method to be used in RF transmissions. The Index-N disclosure described a data compression method for use with binary modulation systems. It reduces the number of radio carrier modulation events, thus reducing the amount of radio sideband emissions, while increasing the amount of information conveyed by a factor of 400% when a frame size of 16 RF cycles is used. Additionally it was shown that Index-N can simplify receiver design by incorporating a synchronous data clock into the carrier signal itself without adding any additional payload overhead or adding to the number of modulation events.

A bandwidth and power spectrum density control of sideband energy method applied to the TICM invention, or other methods of modulation, was also disclosed called X padding. X padding is used to set the pulse repetition rate or symbol rate to fit a particular Power Spectrum Density (PSD) need. This is done by inserting X number of un-modulated RF cycles to the beginning and to the end of the N Frame. This improvement on the compression system allows for coordinating the modulation events thus allowing more transmissions in coverage areas.

The invention accordingly, comprises the coordinated padding and compression technique and the methods possessing the steps, which are exemplified in the following detailed description.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the following detailed description, taken in connection with the accompanying drawings, in which:

FIG. 4 is a representation of an Index N with X padding bit rate table

FIGS. 5a and 5b are a block diagram representation of two transmitters used in the disclosed system (5b) and the transmission formatting (5a).

DETAILED DESCRIPTION OF THE INVENTION

Figures 1, 2:
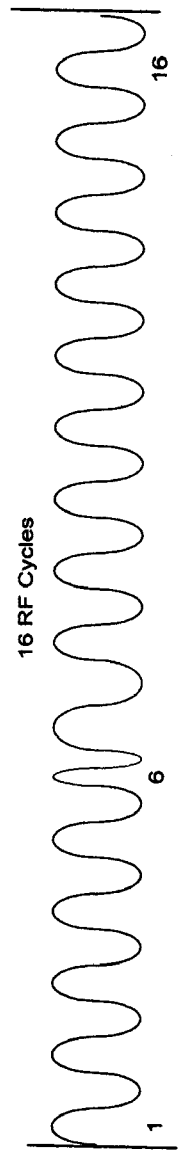
FIG. 1 is a representation of an Index N waveform scheme
FIG. 2 is a representation of an Index N bit rate table

In U.S. patent application Ser. No. 09/511,470 filed by Joseph Bobier (the inventor of this patent application), the contents of which are incorporated herein, a new method of carrier modulation referred to as "missing cycle modulation" (MCM) was disclosed. That method of modulation uses an RF carrier comprised of a continuum of full cycle sinusoidal wavelets extending between zero crossover points or positions, and that carrier is then modulated to carry binary information by selectively deleting one or a succession of carrier wavelets. Such a deletion may be assigned to represent either a binary one or zero value. The deletional modulation is carried out by the removal, by switching, of data related wavelets at the sinusoidal zero crossing positions defining them.

Inasmuch as these zero positions correspond with the absence of electro-magnetic wave energy, few wave disturbances are invoked which, would in turn, produce side frequencies. As a consequence, the assigned carrier frequencies may be quite close together in value to provide a substantially improved utilization of the radio spectrum for binary data transmittal.

In a related U.S. patent application, Ser. No. 09/916,054 also filed by Joseph Bobier, the contents of which are incorporated herein, the deletional modulation of the original invention was modified to merely suppress the amplitude of the cycle resulting in suppressed cycle modulation (SCM). This type of modulation is accomplished when the carrier is amplitude modulated with a modulation signal that is equal in frequency to the carrier itself and the modulation always begins or ends upon the exact zero voltage crossing point of the RF cycle phase. The modulation is applied as a shift of the amplitude of any single cycle, each cycle representing a single bit of data. In SCM, each individual RF cycle represents one bit of data. A single cycle of RF will either represent a "1" or "0" depending upon the amplitude of the cycle, relative to other adjacent cycles in the same carrier. It is necessary to visualize the carrier as a bit stream, rather than a carrier. The relative amplitude of one bit to another will determine the logical state. For instance, a cycle which is relatively higher in amplitude than other cycles in the stream might be considered to represent a "1". Conversely, a cycle that is relatively lower in amplitude than other cycles in the bit stream might be considered to represent a "0". In a related U.S. Patent Application filed Jan. 27, 2004 (Ser. No. 10/765,442), also filed by Joseph Bobier, the contents of which are incorporated herein, Integer Cycle Frequency Hopping (ICFH) modulation, a unique method of radio frequency modulation, was disclosed. The purpose of that method was to cause a radio frequency carrier to convey information in a manner that will utilize the minimum radio spectrum bandwidth while simultaneously conveying information at the highest possible rate.

In a related U.S. Patent Application, filed Jun. 24, 2004 (Ser. No. 10/875,419), also filed by Joseph Bobier, the contents of which are incorporated herein, Tri-State Integer Cycle Modulation (TICM), a further unique method of radio frequency modulation, was disclosed. The purpose of that method was also to cause a radio frequency carrier to convey information in a manner that will utilize the minimum radio spectrum bandwidth with sideband energies that are substantially suppressed, often well below the noise floor, while simultaneously conveying information at the highest possible rate. The parameters of TICM are as follows:

The carrier wave consists of a continuum of sine wave RF cycles at a given fixed frequency. This frequency range can vary from low-frequency radio signals to high-frequency microwave.

All RF cycles are perfect sine waves.

Data is imposed upon the carrier wave by altering the base radio frequency of two sine waves of the continuum. A modulation event therefore consists of the frequency modification of two RF sine wave cycles (wavelets). Note that three (3), and only three (3) frequencies are needed for the TICM modulation scheme. These three (3) frequencies can be extremely close (e.g. less than 30 Khz apart, which is a standard cellular channel) or significantly further apart, depending upon the ability of the receiver to differentiate the frequencies. The modulation can thus be thought of as performed on an integer cycle basis because large groups of RF cycles need not be altered or modulated to convey the information. The sequence of events in the formation of one modulation event is as follows:

Insert at least one, or other integer number of sinewave cycles into the carrier cycle continuum that are higher in frequency than the carrier.

Follow the above cycle with another cycle, or same integer number of cycles, that are lower in frequency than the carrier. Return to the carrier frequency for the next and all proceeding cycles.

Between the base frequency sine waves and the modulated (alternate) frequency sine waves, there is perfect phase continuity. That is to say, the altered frequency sine waves will begin exactly at the 360 degree zero crossing point of the preceding cycle, and will continue through 360 degrees to an end exactly at the zero degree, zero crossing point of the proceeding sine wave.

The difference in radio frequency between, base carrier cycles and modulation event cycles is arbitrary, only constrained by the ability of the de-modulator to reliably differentiate the two signals.

The receiver (de-modulator) need only compare the frequency (phase time) of the current sine wave to the previous sine wave to determine whether or not a modulation event has occurred. Disclosure of a novel receiver which can be used to de-modulate the TICM waveforms was made in a U.S. Patent Application filed by the inventor on May 31, 2005 (Ser. No. 11/142,519) and is hereby incorporated by reference.

A compression method applied to the TICM invention, or other methods of modulation, was also previously disclosed in a U.S. Patent Application filed by the inventor on Jan. 28, 2004 (Ser. No. 10/766,556) called Index-N wherein multiple modulating frequencies are utilized to represent multiple logic conditions thus creating a binary data compression method to be used in RF transmissions. The Index-N disclosure described a data compression method for use with binary modulation systems. It reduces the number of radio carrier modulation events, thus reducing the amount of radio sideband emissions, while increasing the amount of information conveyed by a factor of 400% (when the frame consists of 16 RF cycles). Additionally it was shown that Index-N can simplify receiver design by incorporating a synchronous data clock into the carrier signal itself without adding any additional payload overhead or adding to the number of modulation events.

A bandwidth control of sideband energy and compression method applied to the TICM invention, or other methods of integer cycle modulation, was also recently disclosed by the inventor in a U.S. Patent Application filed Jul. $7^{th}$, 2004 (Ser. No. 60/585,983) called X padding. X padding is used to set the pulse repetition rate to fit a particular Power Spectrum Density (PSD) needs. This is done by inserting X number of un-modulated RF cycles to the beginning and to the end of the N Frame.

An improvement on the bandwidth control and compression method is now disclosed in this application allowing for coordinated modulation events which permits multiple transmissions in a coverage area greatly increasing the amount of information transmitted and available users.

TICM is a modulation technique for radio transmission of digital information. As described above it is one of several unique modulation and encoding techniques developed by the inventor of this application. This class of communication is collectively referred to as integer-cycle modulation. Integer cycle modulation (ICM) is also typically used with a coding system known as Index-N. The common characteristic of all ICM systems is the modulation of an integer numbers of and usually single cycles of radio frequency energy. While the importance of this technique may not seem apparent at first, a simple comparison to more familiar techniques will provide contrast.

Take for instance, FSK. FSK is an old and familiar modulation method, still used around the world. In this technique, a radio frequency carrier will idle at a given authorized center frequency. This might represent a simple binary "0" zero. When it's necessary to represent the alternative binary state, a "1" one, the carrier will shift to another frequency, usually several KHz away. It will remain there for some time, generally dictated by the data transmission rate, until it's time to represent the first binary state. So, the carrier shifts from one frequency to another and back to represent either of two binary states, thus FSK or Frequency Shift Keying. Say for example that a carrier operating at 150 MHz is modulated with data at a rate of 100 Kbps. The carrier will require 1,500 RF cycles to pass at each frequency whenever the corresponding binary value is indicated. Thus, one can represent one bit of data using 1,500 RF cycles at a particular radio frequency. Using this system, the dedicated spectral channel width would be about 100 KHz wide.

Integer cycle modulating systems act upon the carrier differently. These systems, act upon the carrier by forming a one-bit or one-symbol relationship to one cycle of RF energy, or one sinewave. For clarification, the difference between a one-cycle/one-bit relationship and a one-cycle/one-symbol relationship is that one bit of data is one bit of data and one symbol could represent many bits of information, virtually without limit. Integer cycle modulation systems that use no synchronous coding are necessarily one-cycle/one-bit systems while systems that utilize a coding system like Index-N, will necessarily represent many bits of information by virtue of an integer cycle modulation event. That is to say; using integer cycle modulation systems with a synchronous coding system, a single RF cycle can be modulated to represent from two to nearly any number of data bits. This modulation event can be called a "token" or a "symbol" and it should not be confused with the actual data rate which, as a factor of the encoding system, can be much higher than the actual modulation or symbol rate.

The advantages of an integer cycle modulation system should now be evident to those skilled in the art. To represent one symbol or one bit, only a single RF cycle need be modulated. Thus, little perturbation of the RF carrier is effected, resulting in very minimal formation of sideband energy. For the layman, the less you do to the carrier, the less sideband power you form. To the RF engineer not familiar with ICM reception techniques, this plugs into textbook BER formulas as a problem because one expects that it is necessary to form well-defined and powerful sideband energy for the information to be receivable, especially in the presence of noise. ICM signals have particular advantages when correctly processed at the receiver that actually makes them among the best performing RF modulation techniques ever devised, substantially out performing GFSK, BFSK and the like. Conversely, non-ICM reception techniques, essentially what is used by every other radio receiver ever designed, are virtually unable to detect ICM signals, with the exception of the main carrier, which occupies a narrow and well-defined channel of only hundreds of Hertz in practice. This fact makes ICM signals very good neighbors indeed, offering no interference to other traditional radio systems even when those services operate within spectrum that either partly or wholly overlaps the theoretical bandwidth of the ICM signal.

With the terms now defined and background set, we explain the present invention, which is a further improvement to the Index-N coding system now typically used for ICM systems.

ICM systems that use the Index-N coding system are referred to as "synchronous coded systems". Briefly, the carrier signal acts as a clock, which is transmitted by the transmitter and received by the receiver. Being narrow and virtually un-perturbed by modulation a narrow filter is used at the receiver to receive, filter and recover the carrier. Being so narrow and easily filtered, the carrier makes a reliable clock because, even in the presence of substantial noise, the carrier can be recovered easily. The data, represented by a symbol, is formed when upon reception of an ICM modulation event, the receiver, which has been using the received carrier as a clock driving a modulo-N count, can reference an index pointer that points to a particular data pattern. The process is pictorially indicated below in FIG. 1 where N=16.

FIG. 1. depicts a "frame" consisting of 16 RF cycles, two of which are frequency modulated. In this case we would say that using Index-N, N=16, indicating the number of potential locations for the modulation to occur within the group or frame of 16 RF cycles. This diagram depicts a particular type of ICM known as Tri-State Integer Cycle Modulation, whereby the carrier is modulated by first changing the frequency of one RF cycle to a shorter period, then following that with another cycle that is of a longer period than the carrier frequency. Typical implementations of the receiver use the transition from the high frequency cycle to the low frequency cycle as the modulation event upon which to respond and reference the modulo-N count in order to reference the indicated binary combination value.

From FIG. 2 (Table 1) we can see that four binary digits are indicated simply by referencing, or indexing, the location of the modulation event within the frame of N cycles to the modulo-N count. Clearly then, any number of bits could be represented by changing the value of N. For example, if N=256, then 8 bits of data would be represented by any particular location in which the ICM event occurred.

Figure 3:
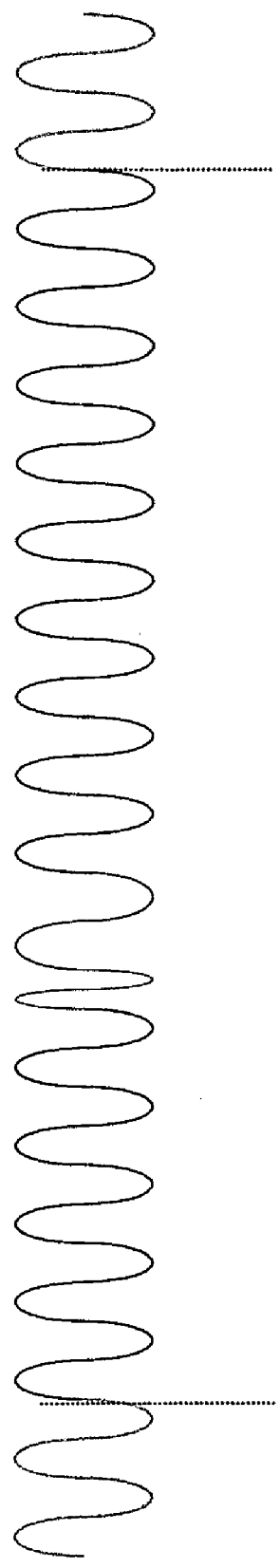
FIG. 3 is a representation of an Index N with X padding waveform scheme

Adding on to the Index-N scheme, a previous application disclosed an improvement designated X padding. X padding is used to set the pulse repetition rate to fit particular Power Spectrum Density (PSD) needs. This is done by inserting X number of un-modulated RF cycles to the beginning and to the end of the N Frame. FIG. 3 depicts a frame N cycles (16) bookended by 2 RF cycles. In this example, X=4. X is a system designer's tool that can be adjusted to virtually any value. Typical practical values might range from 64 to 2048.

The X padding scheme described in the previous disclosure is used with the Index-N encoding scheme to control the bandwidth and power spectrum density of sideband energy generated during the process of ICM modulation. All existing communication systems use some form of bandpass filter system at the output of the transmitter to limit the amount of sideband energy. The bandwidth of such a bandpass filter system is usually fixed. Since ICM can transmit at high data rates, and at relatively low (or high) frequencies over narrow (and or wideband) radio channels, a need arises to dynamically control the bandwidth of ICM sideband energy "on the fly" for a particular channel without relying on a bandpass filter system. The X padding scheme is one such method.

As is well known by those skilled in the art every modulation technique is accompanied by sidebands carrying either useful or redundant information: ICM is no exception either. While it has been proved (both mathematically and analytically) that most of ICM transmitted energy is contained in a bandwidth specified by the carrier frequency, deviation and encoding index-N, a small portion of sideband energy spills outside this band. Instead of using a conventional bandpass filter system, the padding scheme disclosed works in conjunction with the index-N encoding scheme to limit the bandwidth and power spectrum density of sideband energy, thus not only reducing the overall bandwidth, but also help in efficient recovery of the ICM transmitted signal.

As explained above, the X padding scheme works with the Index-N encoding scheme. Index-N provides a representation of a number of data bits by a single modulation event. The design rules for the X padding scheme with index-N encoding are as follows: Radio Frequency (RF) sine waves are grouped into frames of N cycles (divide-by ratio) where N is a variable power of 2 (i.e. 2, 4, 8, 16, 32, 64, 128, 256, 512, etc). This system is flexible wherein N can equal any one of these values. In the frame of N cycles, two alternate cycles are changed to the modulating frequencies. The other cycles remain precisely at the carrier frequency. The position of the alternate modulated cycles in a frame of N-cycles determines the exact binary bits that are being transmitted. This means that by sending only one modulation event where N=16, four (4) bits are transferred. For example, in a frame of 16 cycles (i.e. N=16) where the positions of the alternate modulated cycle is 6, then the four binary bits of information transmitted are 0110. This is illustrated in FIG. 1 and represented in Table 1 of FIG. 2.

Given a carrier frequency (f) of sine waves, the data rate can be calculated using the following formula:

$$\text{Data Rate} = (\log_2 N/N) * f \qquad \text{Equation (1)}$$

The X padding improvement to Index N introduced unmodulated cycles of sine waves either at the start of each frame, or end of each frame, or start and end of each frame. Depending upon the nature of the system, the number of padded cycles at the start of a frame may or may not be equal to the number of padded cycles at the end of the frame. Thus a frame of 16 cycles (i.e. N=16, shown in FIG. 1) with a padding size of 4 (two lighter lined cycles at the start and 2 lighter lined cycles at the end of frame) is shown below in FIG. 3: From FIG. 3, it is clear that the X padding scheme increases the number of unmodulated cycles in a frame, which results in altering the position of the alternate modulated cycles. However, the total number of cycles used to represent data remains the same. At the start of each transmission, the padding format is defined and a special code is transmitted to the receiver to inform it about the padding format. The receiver demodulates the received data and, during decoding, accounts for the added padded cycles.

Since padding increases the number of unmodulated cycles in a frame, it results in lowering a of the data rate for an ICM transmission. The new data rate, taking into account P cycles of padding is given as:

$$\text{Data Rate} = [\log_2 N/(N+P)] * f \qquad \text{Equation (2)}$$

Where f=carrier frequency
N=Encoding index
P=Number of padding cycles

Based on this formula table 2 is generated for a specific carrier frequency (i.e. f=900 MHz). This table 2 is shown in FIG. 4: From table 2, one can achieve the same or even better data rates using a suitable combination of N and padding size.

As mentioned earlier, padding increases the number of unmodulated cycles in a given frame, and results in band limiting the energy of the sidebands by bringing them closer to the main carrier frequency and reducing the average power contained within the sidebands.

The foregoing discussion provides the reader with a basic explanation of how Index-N is implemented in practice as well as a rudimentary understanding of ICM modulation strategies. The present invention is an improvement in the foregoing coding scheme that allows for coordinated modulation events permitting multiple transmissions in a coverage area thus greatly increasing the amount of information transmitted and the amount of available users as will become evident.

Figure 6A:
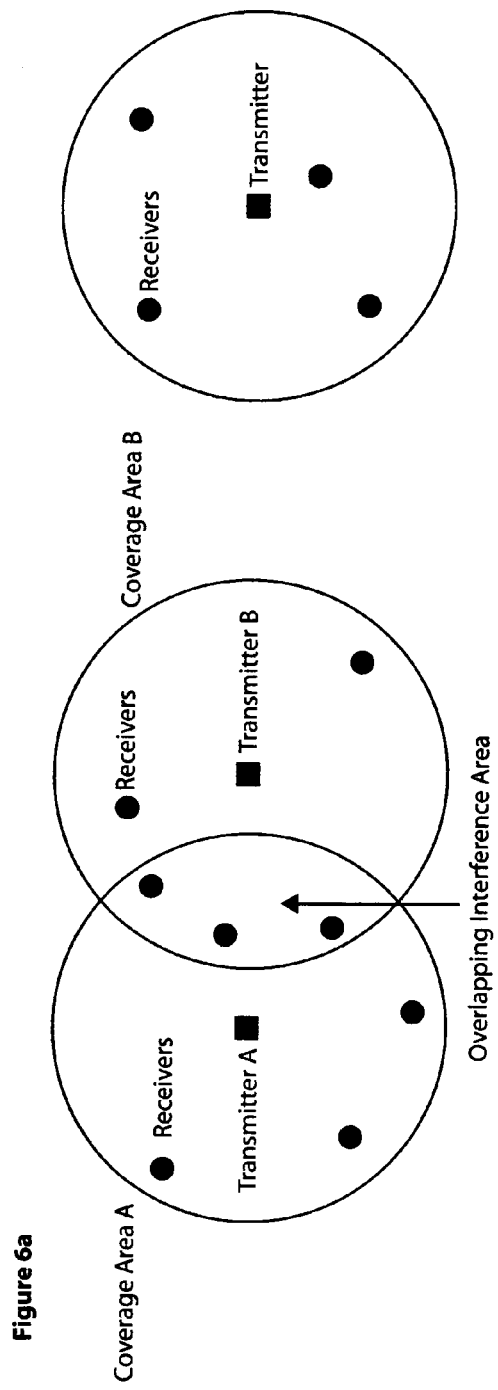
FIGS. 6a and 6b are a representation of an overlapping multiple transmission coverage area and a non-overlapping coverage area (6a) along with a block diagram of the receiver used in the disclosed system (6b).

Presently Index-N is used when a single transmitter will transmit to one or more receivers with no interference from other ICM transmitters on the same frequency in the same coverage area as shown in FIG. 6a. In which case, no special techniques are required other than those described above.

Figure 6B:
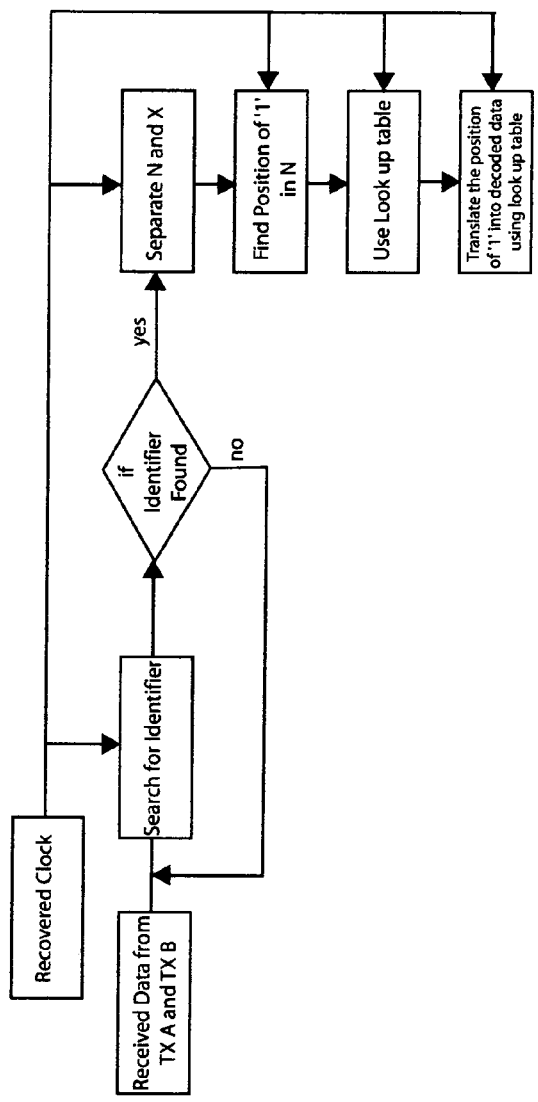

Often a single transmitter, due to service area size, geography or man-made obstructions, cannot fully serve a market area. In this case it may be desirable to operate more than one transmitter. If ubiquitous coverage is desirable, some areas will receive signal from more than one transmitter as shown in FIG. 6. These areas will experience interference. Some method of eliminating that interference is necessary.

An improvement to Index-N is now disclosed that can eliminate the interference problem and simultaneously increase the total data throughput of a metropolitan network. As shown in the block diagram of FIG. 5b one transmitter modulated the received data stream by receiving the binary data that gets grouped and correlated to clock signals that are segmented (grouped) with unaltered wavelets being inserted and then combined into a modulated carrier for transmission. A second transmitter can also operate at different insertion values as shown. The formatting of the modulated signals produced by the two transmitters is also shown in FIG. 5a where both transmitters are using the same value of N and X, however, the arrangement of N and X are different for both of the transmitters. Transmitter A's format is 512 cycles of X, followed by 16 cycles of N and finally 512 cycles of X. Transmitter B's format is 512 cycles of X, followed by 16 cycles of N and finally 528 cycles of X. As shown in the block diagram of FIG. 6b a receiver then receives the transmitted signal from the two transmitters, demodulates, decompresses and reconstructs the data sequence.

Assume a typical transmission from an ICM transmitter:
[ . . . 512 . . . {index-N (16)} . . . 512 . . . ]
Where X=1024 and N=16.

Typically, the index-N frame is book ended between ½ of the value of X as shown above and in FIG. 3. If we offset the X cycles, say 16 cycles to the left or right, moving the same number of X cycles to the other side, it would look like this:

[ . . . 496 . . . {index-N (16)} . . . 528 . . . ]

The only portion of this transmission of 4 data bits, by virtue of index-N (16) that can be modulated is an integer cycle, or pair of integer cycles located somewhere within the frame of 16 RF cycles. By moving the 16-cycle frame to another section of the transmission, which is guaranteed not to have modulation otherwise, a time slot is found where interference free transmission is possible. Thus transmitter A is always going use the 512–512 cycle timing of its data frame and transmitter B will always use the 496–528 cycle timing sequence.

It can be seen that depending upon the selected ratio of N and X, many time slots can be allocated for the concurrent use of a single radio frequency in a geographically overlapping arrangement such as shown in FIG. 6a. Theoretically, when X=1024 and N=16, 32 distinct time slots are available. This creates a powerful method of frequency re-use without expensive hardware. For instance, typical methods of frequency re-use require sectorized or even "smart" antennas that can steer RF energy to or away from specific zones. Other methods require a group of frequencies that are arranged geographically so that neighboring stations always use different frequencies, acting as a buffer. Frequencies are not re-used until there is no chance of a geographical overlap due to shear distance.

Using coordinated Index-N and ICM methods, simple omni-directional antennas will continue to radiate to as many users as possible while a base station some distance away can serve its users, un-encumbered, providing large areas of contiguous service area, even between the stations where signals overlap. System throughputs increase too. Transmitter A can have a fully different data stream than transmitter B, resulting in a 100% increase in overall network capacity. This is in contradiction to systems that must simulcast identical information in order to prevent interference. Other systems sequence transmitters, only activating one transmitter at a time until a message is broadcast over an entire network. This is a very inefficient method that gets worse as network size increases. Using coordinated Index-N and ICM methods these problems are solved in a more efficient manner.

Since certain changes may be made in the above described RF signal and compression method without departing from the scope of the invention herein involved, it is intended that all matter contained in the description thereof or shown in the accompanying figures shall be interpreted as illustrative and not in a limiting sense.

What is claimed is:

1. A method of generating coordinated modulation signals using compressed integer cycle or impulse modulation on a carrier to avoid collocated signal interference comprising the steps of:

grouping wavelets of the carrier into wavelet groups containing two or more wavelets;
receiving an information stream as a binary data sequence of first and second binary states;
grouping said binary data sequence of first and second binary states into binary groups of two or more first and second binary states;
correlating one of each said wavelets in said wavelet groups with one of each possible binary values of each said binary groups;
modulating said carrier in accordance with said binary data sequence by altering the amplitude, frequency, or phase of one of each said wavelets in said wavelet groups corresponding to one of each said binary values of said binary groups forming altered wavelet groups; and,
inserting one or more unaltered wavelet groups at the beginning or at the end of each of said altered wavelet groups resulting in a coordinated compressed binary modulated carrier.

2. The method of claim 1 wherein:
the modulating of said carrier is carried out by altering the amplitude, frequency, or phase of said wavelets while minimizing sideband distortions of said carrier.

3. The method of claim 1 comprising the additional step of:
reducing of harmonics produced from modulating said carrier by filtering said sideband limited compressed binary modulated carrier.

4. The method of claim 1 comprising the additional step of:
broadcasting said coordinated compressed binary modulated carrier.

5. A method for demodulating coordinated compressed binary information that was derived from a binary information stream composed of a binary data sequence of first and second binary states that was integer cycle or impulse modulated onto a carrier in which the carrier has been modulated in accordance with said binary data sequence by grouping said wavelets into wavelet groups containing two or more wavelets; receiving said information stream as a binary data sequence of first and second binary states; grouping said binary data sequence of first and second binary states into binary groups of two or more first and second binary states; correlating one of each said wavelets in said wavelet group with one of each possible binary values of each said binary groups; modulating said carrier in accordance with said binary data sequence by altering the amplitude, frequency, or phase of the one of each said wavelets in said wavelet groups corresponding to one of each said binary values of said binary groups forming altered wavelet groups; and inserting one or more unaltered wavelet groups at the beginning or at the end of each of said altered wavelet groups resulting in a coordinated compressed binary modulated carrier which was broadcasted to avoid collocated signal interference comprising the steps of:

receiving said broadcasted coordinated compressed binary modulated carrier;
demodulating and decompressing said coordinated compressed binary modulated carrier by ignoring said one or more unaltered wavelet groups at the beginning or at the end of each of said altered wavelet groups and detecting the respective amplitude, frequency, or phase of said wavelets to identify said altered wavelets in said altered wavelet groups and correlating to said binary values of said binary groups; and,
reconstructing said binary data sequence from said binary values of said binary groups resulting in regeneration of said information stream.

6. A modulation and demodulation method for modulation systems using compressed integer cycle or impulse modulation on a carrier to avoid collocated signal interference comprising the steps of:

grouping wavelets of the carrier into wavelet groups containing two or more wavelets;
receiving an information stream as a binary data sequence of first and second binary states;
grouping said binary data sequence of first and second binary states into binary groups of two or more first and second binary states;

correlating one of each said wavelets in said wavelet groups with one of each possible binary values of each said binary groups;

modulating said carrier in accordance with said binary data sequence by altering the amplitude, frequency, or phase of one of each said wavelets in said wavelet groups corresponding to one of each said binary values of said binary groups forming altered wavelet groups;

inserting one or more unaltered wavelet groups at the beginning or at the end of each of said altered wavelet groups resulting in a coordinated compressed binary modulated carrier;

broadcasting said coordinated compressed binary modulated carrier;

receiving said coordinated compressed binary modulated carrier;

demodulating and decompressing said coordinated compressed binary modulated carrier by ignoring said one or more unaltered wavelet groups at the beginning or at the end of each of said altered wavelet groups and detecting the respective amplitude, frequency, or phase of said wavelets to identify said altered wavelets in said altered wavelet groups and correlating to said binary values of said binary groups; and, reconstructing said binary data sequence from said binary values of said binary groups resulting in regeneration of said information stream.

7. The method of claim 6 wherein:

the modulating of carrier is carried out by altering the amplitude, frequency or phase of said wavelets while minimizing sideband distortions of said carrier.

8. The method of claim 6 comprising the additional step of:

reducing of harmonics produced by modulating said carrier by filtering said carrier.

* * * * *